United States Patent Office 3,086,012
Patented Apr. 16, 1963

3,086,012
2-HYDROXYMETHYL-Δ²-CORTICOIDS
Albert Bowers and James C. Orr, Mexico City, Mexico, assignors, by mesne assignments, to Syntex Corporation, a corporation of Panama
No Drawing. Filed Sept. 15, 1961, Ser. No. 138,266
27 Claims. (Cl. 260—239.55)

The present invention relates to novel cyclopentanophenanthrene derivatives and to a process for the production thereof.

More particularly the present invention relates to derivatives of 2-hydroxymethyl-Δ²-cortical hormones.

The novel compounds of the present invention which are powerful anti-inflammatory agents with low catabolic activities and which also exhibit glycogenic, thymolytic, anti-estrogenic and anti-gonadotrophic activities are represented by the following formulas:

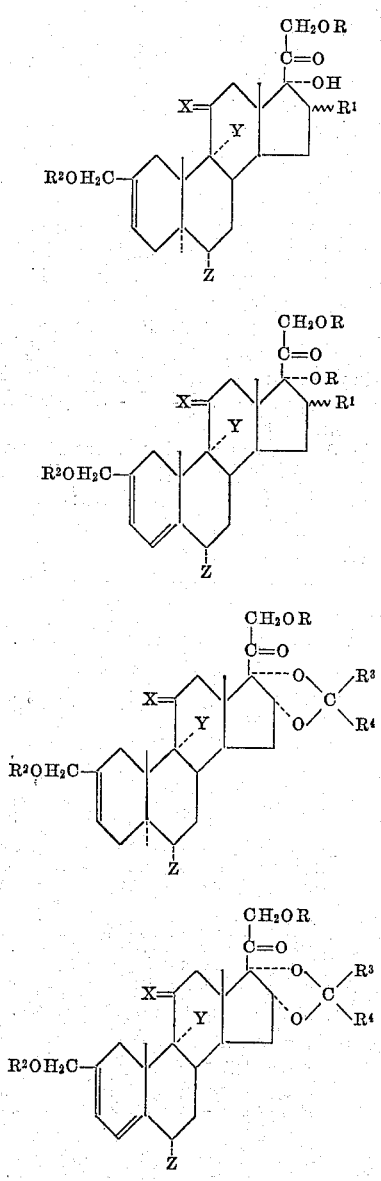

In the above formulas X represents β-hydroxy or keto; Y represents hydrogen, fluorine or chlorine; Z represents hydrogen, fluorine, chlorine or methyl; R and $R^2$ represent hydrogen or a hydrocarbon carboxylic acyl group of less than 12 carbon atoms; $R^1$ represents hydrogen, α-methyl, β-methyl, α-hydroxyl or α-hydrocarbon carboxylic acyloxy of less than 12 carbon atoms and $R^3$ and $R^4$ represent hydrogen or the residue of a hydrocarbon radical containing up to 8 carbon atoms of straight, branched, cyclic or mixed aliphatic-cyclic chain, saturated or unsaturated and including aromatic groups. The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

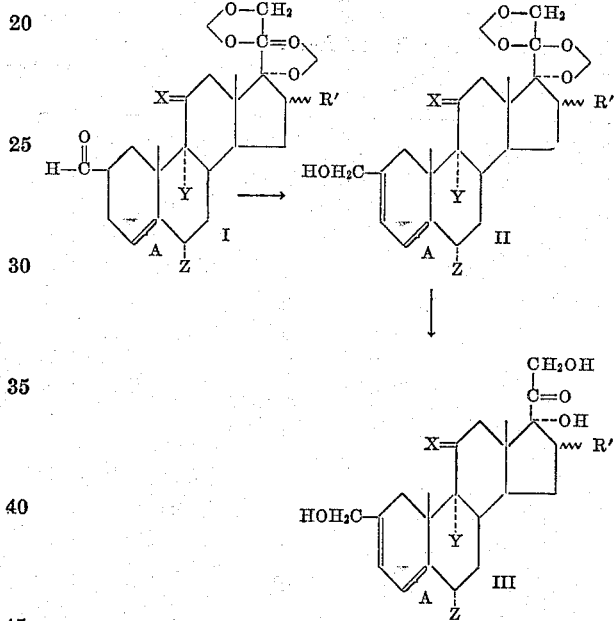

In the above formulas X, Y, Z and $R^1$ have the same meaning previously set forth; and A represents a double bond or a saturated linkage between C–4 and C–5.

In practicing the process just outlined the starting 2-formyl - 17,20;20,21-bismethylenedioxy-Δ²-allopregnen or 2 - formyl - 17,20;20,21 - bismethylenedioxy - Δ²,⁴ - pregnadien compound (I) (obtained in accordance with our copending U.S. patent application Serial No. 138,267 filed of even date) is reduced preferably with sodium borohydride to the corresponding 2-hydroxymethyl-17,20;20,21-bismethylenedioxy derivative (II). Hydrolysis of the 17,20;20,21-bismethylenedioxy group in an acid medium such as 60% formic acid or 80% acetic acid furnishes the corresponding 2-hydroxymethyl-17α,21-diol-20-one derivative (III).

The primary hydroxyl groups of the heretofore obtained compounds, such as those present in the 2-hydroxymethyl group and in the 21-position, and/or the secondary hydroxyl groups such as the C-16α-hydroxyl, are conventionally acylated in pyridine with an acylating agent, as for example the anhydride of a hydrocarbon carboxylic acid of the type described hereinbefore, thus affording the corresponding acyloxy derivatives.

The above mentioned compounds with a hydroxyl group at C-16α and a hydroxyl group at C-17α are converted into the 16α,17α-cyclic acetal or 16α,17α-cyclic ketal by reaction with an aldehyde or ketone such as acetone, formaldehyde, paraldehyde, acetaldehyde, acetophenone, benzophenone, methyl ethyl ketone, diethyl ketone and other similar aldehydes and ketones in the presence of an acid catalyst such as perchloric acid or hydrochloric acid.

The following specific examples serve to illustrate but are not intended to limit the scope of the present invention:

Example I

A solution of 1 g. of sodium borohydride in 3 cc. of water was added to an ice-cooled solution of 1 g. of 2-formyl-16α-methyl-6α-fluoro-17,20;20,21-bis-methylenedioxy-$\Delta^2$-allopregnen-11-one in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give the 2-hydroxymethyl-16α-methyl-6α-fluoro-17,20;20,21-bismethylenedioxy-$\Delta^2$-allopregnen-11-one.

Following the above technique, there were treated the starting materials listed below, affording the corresponding products hereinafter set forth.

| Starting compound | Product |
| --- | --- |
| 2-formyl-16α-methyl-6α,9α-difluoro-17,20; 20,21-bismethylenedioxy-$\Delta^2$-allopregnen-11-one. | 2-hydroxymethyl-16-α-methyl-6α,9α-difluoro-17,20; 20,21-bismethylenedioxy-$\Delta^2$-allopregnen-11-one. |
| 2-formyl-16α-methyl-6α-fluoro-9α-chloro-17,20; 20,21-bismethylenedioxy-$\Delta^2$-allopregnen-11-one. | 2-hydroxymethyl-16-α-methyl-6α-fluoro-9α-chloro-17,20; 20,21-bismethylenedioxy-$\Delta^2$-allopregnen-11-one. |
| 2-formyl-16α-methyl-6α-fluoro-17,20; 20,21-bismethylenedioxy-$\Delta^2$-allopregnen-11β-ol. | 2-hydroxymethyl-16α-methyl-6α-fluoro-17,20; 20,21-bismethylenedioxy-$\Delta^2$-allopregnen-11β-ol. |
| 2-formyl-16α-methyl-6α,9α-difluoro-17,20; 20,21-bismethylenedioxy-$\Delta^2$-allopregnen-11β-ol. | 2-hydroxymethyl-16α-methyl-6α,9α-difluoro-17,20; 20,21-bismethylenedioxy-$\Delta^2$-allopregnen-11β-ol. |
| 2-formyl-16α-methyl-6α-fluoro-9α-chloro-17,20; 20,21-bismethylenedioxy-$\Delta^2$-allopregnen-11β-ol. | 2-hydroxymethyl-16α-methyl-6α-fluoro-9α-chloro-17,20; 20,21-bismethylenedioxy-$\Delta^2$-allopregnen-11β-ol. |
| 2-formyl-16β-methyl-6α,9α-difluoro-17,20; 20,21-bismethylenedioxy-$\Delta^2$-allopregnen-11-one. | 2-hydroxymethyl-16β-methyl-6α,9α-difluoro-17,20; 20,21-bismethylenedioxy-$\Delta^2$-allopregnen-11-one. |
| 2-formyl-16β-methyl-6α,9α-difluoro-17,20; 20,21-bismethylenedioxy-$\Delta^2$-allopregnen-11β-ol. | 2-hydroxy-methyl-16β-methyl-6α,9α-difluoro-17,20; 20,21-bismethylenedioxy-$\Delta^2$-allopregnen-11β-ol. |
| 2-formyl-6α,16β-dimethyl-17,20; 20,21-bismethylenedioxy-$\Delta^2$-allopregnen-11-one. | 2-hydroxymethyl-6α,16β-dimethyl-17,20; 20,21-bismethylenedioxy-$\Delta^2$-allopregnen-11-one. |
| 2-formyl-6α,16β-dimethyl-17,20; 20,21-bismethylenedioxy-$\Delta^2$-allopregnen-11β-ol. | 2-hydroxymethyl-6α,16β-dimethyl-17,20; 20,21-bismethylenedioxy-$\Delta^2$-allopregnen-11β-ol. |
| 2-formyl-6α-chloro-9α-fluoro-17,20; 20,21-bismethylenedioxy-$\Delta^2$-allopregnen-16α-ol-11-one. | 2-hydroxymethyl-6α-chloro-9α-fluoro-17,20; 20,21-bismethylenedioxy-$\Delta^2$-allopregnen-16α-ol-11-one. |
| 2-formyl-6α-chloro-9α-fluoro-17,20; 20,21-bismethylenedioxy-$\Delta^2$-allopregnen-11β,16α-diol. | 2-hydroxymethyl-6α-chloro-9α-fluoro-17,20; 20,21-bismethylenedioxy-$\Delta^2$-allopregnen-11β,16α-diol. |
| 2-formyl-9α-fluoro-17,20; 20,21-bismethylenedioxy-$\Delta^2$-allopregnen-11β,16α-diol. | 2-hydroxymethyl-9α-fluoro-17,20; 20,21-bismethylenedioxy-$\Delta^2$-allopregnen-11β,16α-diol. |
| 2-formyl-9α-fluoro-17,20; 20,21-bismethylenedioxy-$\Delta^2$-allopregnen-16α-ol-11-one. | 2-hydroxmethyl-9α-fluoro-17,20; 20,21-bismethylenedioxy-$\Delta^2$-allopregnen-16α-ol-11-one. |
| 2-formyl-17,20; 20,21-bismethylenedioxy-$\Delta^2$-allopregnen-11β-ol. | 2-hydroxymethyl-17,20; 20,21-bismethylenedioxy-$\Delta^2$-allopregnen-11β-ol. |
| 2-formyl-6α-methyl-17,20; 20,21-bismethylenedioxy-$\Delta^2$-allopregnen-11β-ol. | 2-hydroxymethyl-6α-methyl-17,20; 20,21-bismethylenedioxy-$\Delta^2$-allopregnen-11β,16α-diol. |
| 2-formyl-16α-methyl-6α,9α-difluoro-17,20; 20,21-bismethylenedioxy-$\Delta^{2,4}$-pregnadien-11β-ol. | 2-hydroxymethyl-16α-methyl-6α,9α-difluoro-17,20; 20,21-bismethylenedioxy-$\Delta^{2,4}$-pregnadien-11β-ol. |
| 2-formyl-16α-methyl-6α-fluoro-9α-chloro-17,20; 20,21-bismethylenedioxy-$\Delta^{2,4}$-pregnadien-11β-ol. | 2-hydroxymethyl-16α-methyl-6α-fluoro-9α-chloro-17,20; 20,21-bismethylenedioxy-$\Delta^{2,4}$-pregnadien-11β-ol. |
| 2-formyl-16β-methyl-6α,9α-difluoro-17,20; 20,21-bismethylenedioxy-$\Delta^{2,4}$-pregnadien-11β-ol. | 2-hydroxymethyl-16β-methyl-6α,9α-difluoro-17,20; 20,21-bismethylenedioxy-$\Delta^{2,4}$-pregnadien-11β-ol. |
| 2-formyl-6α,16β-dimethyl-17,20; 20,21-bismethylenedioxy-$\Delta^{2,4}$-pregnadien-11β-ol. | 2-hydroxymethyl-6α,16β-dimethyl-17,20; 20,21-bismethylenedioxy-$\Delta^{2,4}$-pregnadien-11β-ol. |
| 2-formyl-6α-chloro-9α-fluoro-17,20; 20,21-bismethylenedioxy-$\Delta^{2,4}$-pregnadien-11β,16α-diol. | 2-hydroxymethyl-6α-chloro-9α-fluoro-17,20; 20,21-bismethylenedioxy-$\Delta^{2,4}$-pregnadien-11β,16α-diol. |
| 2-formyl-9α-fluoro-17,20; 20,21-bismethylenedioxy-$\Delta^{2,4}$-pregnadien-11β,16α-diol. | 2-hydroxymethyl-9α-fluoro-17,20; 20,21-bismethylenedioxy-$\Delta^{2,4}$-pregnadien-11β,16α-diol. |
| 2-formyl-16α-methyl-6α-fluoro-17,20; 20,21-bismethylenedioxy-$\Delta^{2,4}$-pregnadien-11-one. | 2-hydroxymethyl-16α-methyl-6α-fluoro-17,20; 20,21-bismethylenedioxy-$\Delta^{2,4}$-pregnadien-11-one. |
| 2-formyl-16α-methyl-6α-fluoro-17,20; 20,21-bismethylenedioxy-$\Delta^{2,4}$-pregnadien-11β-ol. | 2-hydroxymethyl-16α-methyl-6α-fluoro-17,20; 20,21-bismethylenedioxy-$\Delta^{2,4}$-pregnadien-11β-ol. |
| 2-formyl-16α-methyl-6α-fluoro-9α-chloro-17,20; 20,21-bismethylenedioxy-$\Delta^{2,4}$-pregnadien-11-one. | 2-hydroxymethyl-16α-methyl-6α-fluoro-9α-chloro-17,20; 20,21-bismethylenedioxy-$\Delta^{2,4}$-pregnadien-11-one. |
| 2-formyl-16α-methyl-6α, 9α-difluoro-17,20; 20,21-bismethylenedioxy-$\Delta^{2,4}$-pregnadien-11-one. | 2-hydroxymethyl-16α-methyl-6α, 9α-difluoro-17,20; 20,21-bismethylenedioxy-$\Delta^{2,4}$-pregnadien-11-one. |
| 2-formyl-16β-methyl-6α,9α-difluoro-17,20; 20,21-bismethylenedioxy-$\Delta^{2,4}$-pregnadien-11-one. | 2-hydroxymethyl-16β-methyl-6α,9α-difluoro-17,20; 20,21-bismethylenedioxy-$\Delta^{2,4}$-pregnadien-11-one. |
| 2-formyl-6α,16β-dimethyl-17,20; 20,21-bismethylenedioxy-$\Delta^{2,4}$-pregnadien-11-one. | 2-hydroxymethyl-6α,16β-dimethyl-17,20; 20,21-bismethylenedioxy-$\Delta^{2,4}$-pregnadien-11-one. |
| 2-formyl-9α-chloro-9α-fluoro-17,20; 20,21-bismethylenedioxy-$\Delta^{2,4}$-pregnadien-16α-ol-11-one. | 2-hydroxymethyl-6α-chloro-9α-fluoro-17,20; 20,21-bismethylenedioxy-$\Delta^{2,4}$-pregnadien-16α-ol-11-one. |
| 2-formyl-9α-fluoro-17,20; 20,21-bismethylenedioxy-$\Delta^{2,4}$-pregnadien-16α-ol-11-one. | 2-hydroxymethyl-9α-fluoro-17,20; 20,21-bismethylenedioxy-$\Delta^{2,4}$-pregnadien-16α-ol-11-one. |
| 2-formyl-17,20; 20,21-bismethylenedioxy-$\Delta^{2,4}$-pregnadien-11β-ol. | 2-hydroxymethyl-17,20; 20,21-bismethylenedioxy-$\Delta^{2,4}$-pregnadien-11β-ol. |
| 2-formyl-6α-methyl-17,20; 20,21-bismethylenedioxy-$\Delta^{2,4}$-pregnadien-11β,16α-diol. | 2-hydroxymethyl-6α-methyl-17,20; 20,21-bismethylenedioxy-$\Delta^{2,4}$-pregnadien-11β,16α-diol. |

Example II 1 g. of 2-hydroxymethyl-16α,methyl-6α-fluoro-17,20; 20,21-bismethylenedioxy-$\Delta^2$-allopregnen-11-one was heated on the steam bath with 20 cc. of 60% formic acid for 1 hour, cooled, diluted with water and the precipitate was collected, washed with water, dried, and recrystallized from acetone-hexane, thus affording 2-hydroxymethyl-16α-methyl-6α-fluoro-$\Delta^2$-allopregnen-17α,21-diol-11,20-dione.

Following the above procedure there were treated the starting compounds listed below affording the corresponding products hereinafter set forth:

| Starting compound | Product |
| --- | --- |
| 2-hydroxymethyl-16α-methyl-6α,9α-difluoro-17,20; 20,21-bismethylenedioxy-$\Delta^2$-allopregnen-11-one. | 2-hydroxymethyl-16α-methyl-6α,9α-difluoro-$\Delta^2$-allopregnene-17α,21-diol-11,20-dione. |
| 2-hydroxymethyl-16α-methyl-6α-fluoro-9α-chloro-17,20; 20-21-bismethylenedioxy-$\Delta^2$-allopregnen-11-one. | 2-hydroxymethyl-16α-methyl-6α-fluoro-9α-chloro-$\Delta^2$-allopregnene-17α,21-diol-11,20-dione. |
| 2-hydroxymethyl-16α-methyl-6α-fluoro-17,20; 20,21-bismethylenedioxy-$\Delta^2$-allopregnen-11β-ol. | 2-hydroxymethyl-16α-methyl-6α-fluoro-$\Delta^2$-allopregnene-11β,17α,21-triol-20-one. |
| 2-hydroxymethyl-16α-methyl-6α,9α-difluoro-17,20; 20,21-bismethylenedioxy-$\Delta^2$-allopregnen-11β-ol. | 2-hydroxymethyl-16α-methyl-6α,9α-difluoro-$\Delta^2$-allopregnene-11β,17α,21-triol-20-one. |
| 2-hydroxymethyl-16α-methyl-6α-fluoro-9α-chloro-17,20; 20,21-bismethylenedioxy-$\Delta^2$-allopregnen-11β-ol. | 2-hydroxymethyl-16α-methyl-6α-fluoro-9α-chloro-$\Delta^2$-allopregnene-11β,17α,21-triol-20-one. |
| 2-hydroxymethyl-16β-methyl-6α,9α-difluoro-17,20; 20,21-bismethylenedioxy-$\Delta^2$-allopregnen-11-one. | 2-hydroxymethyl-16β-methyl-6α,9α-difluoro-$\Delta^2$-allopregnene-17α,21-diol-11,20-dione. |
| 2-hydroxy-methyl-16β-methyl-6α,9α,difluoro-17,20; 20,21-bismethylenedioxy-$\Delta^2$-allopregnen-11β-ol. | 2-hydroxymethyl-16β-methyl-6α,9α-difluoro-$\Delta^2$-allopregnene-11β,17α,21-triol-20-one. |
| 2-hydroxymethyl-6α,16β-dimethyl-17,20; 20,21-bismethylenedioxy-$\Delta^2$-allopregnen-11-one. | 2-hydroxymethyl-6α,16β-dimethyl-$\Delta^2$-allopregnene-17α,21-diol-11,20-dione. |
| 2-hydroxymethyl-6α,16β-dimethyl-17,20; 20,21-bismethylenedioxy-$\Delta^2$-allopregnen-11β-ol. | 2-hydroxymethyl-6α,16β-dimethyl-$\Delta^2$-allopregnene-11β,17α,21-triol-20-one. |
| 2-hydroxymethyl-6α-chloro-9α-fluoro-17,20; 20,21-bismethylenedioxy-$\Delta^2$-allopregnen-16α-ol-11-one. | 2-hydroxymethyl-6α-chloro-9α-fluoro-$\Delta^2$-allopregnene-16α,17α,21-triol-11,20-dione. |
| 2-hydroxymethyl-6α-chloro-9α-fluoro-17,20; 20,21-bismethylenedioxy-$\Delta^2$-allopregnen-11β,16α-diol. | 2-hydroxymethyl-6α-chloro-9α-fluoro-$\Delta^2$-allopregnene-11β,16α,17α,21-tetrol-20-one. |
| 2-hydroxymethyl-9α-fluoro-17,20; 20,21-bismethylenedioxy-$\Delta^2$-allopregnen-11β,16α-diol. | 2-hydroxymethyl-9α-fluoro-$\Delta^2$-allopregnene-11β,16α,17α,21-tetrol-20-one. |

| Starting compound | Product |
|---|---|
| 2-hydroxymethyl-9α-fluoro-17,20; 20,21-bismethylenedioxy-Δ²-allopregnen-16α-ol-11-one. | 2-hydroxymethyl-9α-fluoro-Δ²-allopregnene-16α,17α,21-triol-11,20-dione. |
| 2-hydroxymethyl-17,20; 20,21-bismethylenedioxy-Δ²-allopregnen-11β-ol. | 2-hydroxymethyl-Δ²-allopregnene-11β,17α,21-triol-20-one. |
| 2-hydroxymethyl-6α-methyl-17,20; 20,21-bismethylenedioxy-Δ²-allopregnen-11β,16α-diol. | 2-hydroxymethyl-6α-methyl-Δ²-allopregnene-11β,16α,17α,21-tetrol-20-one. |
| 2-hydroxymethyl-16α-methyl-6α,9α-difluoro-17,20; 20,21-bismethylenedioxy-Δ²,⁴-pregnadien-11β-ol. | 2-hydroxymethyl-16α-methyl-6α,9α-difluoro-Δ²,⁴-pregnadiene-11β,17α,21-triol-20-one. |
| 2-hydroxymethyl-16α-methyl-6α-fluoro-9α-chloro-17,20; 20,21-bismethylenedioxy-Δ²,⁴-pregnadien-11β-ol. | 2-hydroxymethyl-16α-methyl-6α-fluoro-9α-chloro-Δ²,⁴-pregnadiene-11β,17α,21-triol-20-one. |
| 2-hydroxymethyl-16β-methyl-6α,9α-difluoro-17,20; 20,21-bismethylenedioxy-Δ²,⁴-pregnadien-11β-ol. | 2-hydroxymethyl-16β-methyl-6α,9α-difluoro-Δ²,⁴-pregnadiene-11β,17α,21-triol-20-one. |
| 2-hydroxymethyl-6α,16β-dimethyl-17,20; 20,21-bismethylenedioxy,Δ²,⁴-pregnadien-11β-ol. | 2-hydroxymethyl-6α,16β-dimethyl-Δ²,⁴-pregnadiene-11β,17α,21-triol-20-one. |
| 2-hydroxymethyl-6α-chloro-9α-fluoro-17,20; 20,21-bismethylenedioxy,Δ²,⁴-pregnadien-11β,16α-diol. | 2-hydroxymethyl-6α-chloro-9α-fluoro-Δ²,⁴-pregnadiene-11β,16α,17α,21-tetrol-20-one. |
| 2-hydroxymethyl-9α-fluoro-17,20; 20,21-bismethylenedioxy-Δ²,⁴-pregnadien-11β,16α-diol. | 2-hydroxymethyl-9α-fluoro-Δ²,⁴-pregnadiene-11β,16α,17α,21-tetrol-20-one. |
| 2-hydroxymethyl-16α-methyl-6α-fluoro-17,20; 20,21-bismethylenedioxy-Δ²,⁴-pregnadien-11-one. | 2-hydroxymethyl-16α-methyl-6α-fluoro-Δ²,⁴-pregnadiene-17α,21-diol-11,20-dione. |
| 2-hydroxymethyl-16α-methyl-6α-fluoro-17,20; 20,21-bismethylenedioxy-Δ²,⁴-pregnadien-11β-ol. | 2-hydroxymethyl-16α-methyl-6α-fluoro-Δ²,⁴-pregnadiene-11β,17α,21-triol-20-one. |
| 2-hydroxymethyl-16α-methyl-6α-fluoro-9α-chloro-17,20; 20,21-bismethylenedioxy-Δ²,⁴-pregnadien-11-one. | 2-hydroxymethyl-16α-methyl-6α-chloro-9α-chloro-Δ²,⁴-pregnadiene-17α-21-diol-11,20-dione. |
| 2-hydroxymethyl-16α-methyl-6α,9α-difluoro-17,20; 20,21-bismethylenedioxy-Δ²,⁴-pregnadien-11-one. | 2-hydroxymethyl-16α-methyl-6α,9α-difluoro-Δ²,⁴-pregnadiene-17α,21-diol-11,20-dione. |
| 2-hydroxymethyl-16β-methyl-6α,9α-difluoro-17,20; 20,21-bismethylenedioxy-Δ²,⁴-pregnadien-11-one. | 2-hydroxymethyl-16β-methyl-6α,9α-difluoro-Δ²,⁴-pregnadiene-17α,21-diol-11,20-dione. |
| 2-hydroxymethyl-6α,16β-dimethyl-17,20; 20,21-bismethylenedioxy-Δ²,⁴-pregnadien-11-one. | 2-hydroxymethyl-6α,16β-dimethyl-Δ²,⁴-pregnadiene-17α,21-diol-11,20-dione. |
| 2-hydroxymethyl-6α-chloro-9α-fluoro-17,20; 20,21-bismethylenedioxy-Δ²,⁴-pregnadien-16α-ol-11-one. | 2-hydroxymethyl-6α-chloro-9α-fluoro-Δ²,⁴-pregnadiene-16α,17α,21-triol-11,20-dione. |
| 2-hydroxymethyl-9α-fluoro-17,20; 20,21-bismethylenedioxy-Δ²,⁴-pregnadien-16α-ol-11-one. | 2-hydroxymethyl-9α-fluoro-Δ²,⁴-pregnadiene-16α,17α,21-triol-11,20-dione. |
| 2-hydroxymethyl-17,20; 20,21-bismethylenedioxy-Δ²,⁴-pregnadien-11β-ol. | 2-hydroxymethyl-Δ²,⁴-pregnadiene-11β,17α,21-triol-20-one. |
| 2-hydroxymethyl-6α-methyl-17,20; 20,21-bismethylenedioxy-Δ²,⁴-pregnadien-11β,16α-diol. | 2-hydroxymethyl-6α-methyl-Δ²,⁴-pregnadiene-11β,16α,17α,21-tetrol-20-one. |

Example III

A mixture of 1 g. of 2-hydroxymethyl-16α-methyl-6α-fluoro-Δ²-allopregnen-17α,21-diol-11,20-dione, 4 cc. of pyridine and 2 cc. of acetic anhydride was kept at room temperature overnight, poured into ice water, the formed precipitate was filtered off, washed with water and dried. Crystallization from acetone hexane gave 2-acetoxymethyl-16α-methyl-6α-fluoro - Δ² - allopregnen - 17α,21 - diol-11,20-dione-21-acetate.

Following the above technique were treated the starting compounds hereinafter listed, furnishing the products indicated below.

| Starting compound | Product |
|---|---|
| 2-hydroxymethyl-16α-methyl-6α,9α-difluoro-Δ²-allopregnene-17α,21-diol-11,20-dione. | 2-acetoxymethyl-16α-methyl-6α,9α-difluoro-Δ²-allopregnene-17α,21-diol-11,20-dione-21-acetate. |
| 2-hydroxymethyl-16α-methyl-6α-fluoro-9α-chloro-Δ²-allopregnene-17α,21-diol-11,20-dione. | 2-acetoxymethyl-16α-methyl-6α-fluoro-9α-chloro-Δ²-allopregnene-17α,21-diol-11,20-dione-21-acetate. |
| 2-hydroxymethyl-16α-methyl-6α-fluoro-Δ²-allopregnene-11β,17α,21-triol-20-one. | 2-acetoxymethyl-16α-methyl-6α-fluoro-Δ²-allopregnene-11β,17α,21-triol-20-one-21-acetate. |
| 2-hydroxymethyl-16α-methyl-6α,9α-difluoro-Δ²-allopregnene-11β,17α,21-triol-20-one. | 2-acetoxymethyl-16α-methyl-6α,9α-difluoro-Δ²-allopregnene-11β,17α,21-triol-20-one-21-acetate. |
| 2-hydroxymethyl-16α-methyl-6α-fluoro-9α-chloro-Δ²-allopregnene-11β,17α,21-triol-20-one. | 2-acetoxymethyl-16α-methyl-6α-fluoro-9α-chloro-Δ²-allopregnene-11β,17α,21-triol-20-one-21-acetate. |
| 2-hydroxymethyl-16β-methyl-6α,9α-difluoro-Δ²-allopregnene-17α,21-diol-11,20-dione. | 2-acetoxymethyl-16β-methyl-6α,9α-difluoro-Δ²-allopregnene-17α,21-diol-11,20-dione-21-acetate. |
| 2-hydroxymethyl-16β-methyl-6α,9α-difluoro-Δ²-allopregnene-11β,17α,21-triol-20-one. | 2-acetoxymethyl-16β-methyl-6α,9α-difluoro-Δ²-allopregnene-11β,17α,21-triol-20-one-21-acetate |
| 2-hydroxymethyl-6α,16β-dimethyl-Δ²-allopregnene-17α,21-diol-11,20-dione. | 2-acetoxymethyl-6α,16β-dimethyl-Δ²-allopregnene-17α,21-diol-11,20-dione-21-acetate. |
| 2-hydroxymethyl-6α,16β-dimethyl-Δ²-allopregnene-11β,17α,21-triol-20-one. | 2-acetoxymethyl-6α,16β-dimethyl-Δ²-allopregnene-11β,17α,21-triol-20-one-21-acetate. |
| 2-hydroxymethyl-6α-chloro-9α-fluoro-Δ²-allopregnene-16α,17α,21-triol-11,20-dione. | 2-acetoxymethyl-6α-chloro-9α-fluoro-Δ²-allopregnene-16α,17α,21-triol-11,20-dione-16,21-diacetate. |
| 2-hydroxymethyl-6α-chloro-9α-fluoro-Δ²-allopregnene-11β,16α,17α,21-tetrol-20-one. | 2-acetoxymethyl-6α-chloro-9α-fluoro-Δ²-allopregnene-11β,16α,17α,21-tetrol-20-one-16,21-diacetate. |
| 2-hydroxymethyl-9α-fluoro-Δ²-allopregnene-11β,16α,17α,21-tetrol-20-one. | 2-acetoxymethyl-9α-fluoro-Δ²-allopregnene-11β,16α,17α,21-tetrol-20-one-16,21-diacetate. |
| 2-hydroxymethyl-9α-fluoro-Δ²-allopregnene-16α,17α,21-triol-11,20-dione. | 2-acetoxymethyl-9α-fluoro-Δ²-allopregnene-16α,17α,21-triol-11,20-dione-16,21-diacetate. |
| 2-hydroxymethyl-Δ²-allopregnene-11β,17α,21-triol-20-one. | 2-acetoxymethyl-Δ²-allopregnene-11β,17α,21-triol-20-one-21-acetate. |
| 2-hydroxymethyl-6α-methyl-Δ²-allopregnene-11β,16α,17α,21-tetrol-20-one. | 2-acetoxymethyl-6α-methyl-Δ²-allopregnene-11β,16α,17α,21-tetrol-20-one-16,21-diacetate. |
| 2-hydroxymethyl-16α-methyl-6α,9α-difluoro-Δ²,⁴-pregnadiene-11β,17α,21-triol-20-one. | 2-acetoxymethyl-16α-methyl-6α,9α-difluoro-Δ²,⁴-pregnadiene-11β,17α,21-triol-20-one-21-acetate. |
| 2-hydroxymethyl-16α-methyl-6α-fluoro-9α-chloro-Δ²,⁴-pregnadiene-11β,17α,21-triol-20-one. | 2-acetoxymethyl-16α-methyl-6α-fluoro-9α-chloro-Δ²,⁴-pregnadiene-11β,17α,21-triol-20-one-21-acetate. |
| 2-hydroxymethyl-16β-methyl-6α,9α-difluoro-Δ²,⁴-pregnadiene-11β,17α,21-triol-20-one. | 2-acetoxymethyl-16β-methyl-6α,9α-difluoro-Δ²,⁴-pregnadiene-11β,17α,21-triol-20-one-21-acetate. |
| 2-hydroxymethyl-6α,16β-dimethyl-Δ²,⁴-pregnadiene-11β,17α,21-triol-20-one. | 2-acetoxymethyl-6α,16β-dimethyl-Δ²,⁴-pregnadiene-11β,17α,21-triol-20-one-21-acetate. |
| 2-hydroxymethyl-6α-chloro-9α-fluoro-Δ²,⁴-pregnadiene-11β,16α,17α,21-tetrol-20-one. | 2-acetoxymethyl-6α-chloro-9α-fluoro-Δ²,⁴-pregnadiene-11β,16α,17α,21-tetrol-20-one-16,21-diacetate. |
| 2-hydroxymethyl-9α-fluoro-Δ²,⁴-pregnadiene-11β,16α,17α,21-tetrol-20-one. | 2-acetoxymethyl-9α-fluoro-Δ²,⁴-pregnadiene-11β,16α,17α,21-tetrol-20-one-16,21-diacetate. |
| 2-hydroxymethyl-16α-methyl-6α-fluoro-Δ²,⁴-pregnadiene-17α,21-diol-11,20-dione. | 2-acetoxymethyl-16α-methyl-6α-fluoro-Δ²,⁴-pregnadiene-17α,21-diol-11,20-dione-21-acetate. |
| 2-hydroxymethyl-16α-methyl-6α-fluoro-Δ²,⁴-pregnadiene-11β,17α,21-triol-20-one. | 2-acetoxymethyl-16α-methyl-6α-fluoro-Δ²,⁴-pregnadiene-11β,17α,21-triol-20-one-21-acetate. |
| 2-hydroxymethyl-16α-methyl-6α-fluoro-9α-chloro-Δ²,⁴-pregnadiene-17α,21-diol-11,20-dione. | 2-acetoxymethyl-16α-methyl-6α-fluoro-9α-chloro-Δ²,⁴-17α,21-diol-11,20-dione-21-acetate. |
| 2-hydroxymethyl-16α-methyl-6α,9α-difluoro-Δ²,⁴-pregnadiene-17α,21-diol-11,20-dione. | 2-acetoxymethyl-16α-methyl-6α,9α-difluoro-Δ²,⁴-17α,21,diol-11,20-dione-21-acetate. |
| 2-hydroxymethyl-16β-methyl-6α,9α-difluoro-Δ²,⁴-pregnadiene-17α,21-diol-11,20-dione. | 2-acetoxymethyl-16β-methyl-6α,9α-difluoro-Δ²,⁴-pregnadiene-17α,21-diol-11,20-dione-21-acetate. |
| 2-hydroxymethyl-6α,16β-dimethyl-Δ²,⁴-pregnadiene-17α,21-diol-11,20-dione. | 2-acetoxymethyl-6α,16β-dimethyl-Δ²,⁴-pregnadiene-17α,21-diol-11,20-dione-21-acetate. |
| 2-hydroxymethyl-6α-chloro-9α-fluoro-Δ²,⁴-pregnadiene-16α,17α,21-triol-11,20-dione. | 2-acetoxymethyl-6α-chloro-9α-fluoro-Δ²,⁴-pregnadiene-16α,17α,21-triol-11,20-dione-16,21-diacetate. |
| 2-acetoxymethyl-9α-fluoro-Δ²,⁴-pregnadiene-16α,17α,21-triol-11,20-dione. | 2-acetoxymethyl-9α-fluoro-Δ²,⁴-pregnadiene-16α,17α,21-triol-11,20-dione-16,21-diacetate. |
| 2-hydroxymethyl-Δ²,⁴-pregnadiene-11β,17α,21-triol-20-one. | 2-acetoxymethyl-Δ²,⁴-pregnadiene-11β,17α,21-triol-20-one-21-acetate |
| 2-hydroxymethyl-6α-methyl-Δ²,⁴-pregnadiene-11β,16α,17α,21-tetrol-20-one. | 2-acetoxymethyl-6α-methyl-Δ²,⁴-pregnadiene-11β,16α,17α,21-tetrol-20-one-16,21-diacetate. |

Following the above described procedure but substituting acetic anhydride by propionic anhydride, caproic anhydride and cyclopentylpropionic anhydride there were obtained the corresponding propionates, caproates and cyclopentylpropionates of the hereinbefore listed starting compounds.

Example IV

To 120 cc. of acetone containing 1 g. of 2-hydroxymethyl - 6α - chloro - 9α - fluoro - Δ² - allopregnene - 16α,17α,21-triol-11,20-dione, prepared in Example II, were added 30 drops of 70% perchloric acid. After one hour at room temperature, 30 drops of pyridine were added and the resulting solution was evaporated to dryness under reduced pressure. There were then added 30 cc. of water to the residue and it was then extracted several times with 80 cc. of ethyl acetate. The combined extracts were washed to neutrality with water, dried over sodium sulfate and evaporated to dryness. The residue upon trituration with methanol gave a crude 16,17-acetonide. Recrystallizations from the same solvent furnished the 16,17-acetonide of 2-hydroxymethyl-6α-chloro-9α-fluoro-Δ²-allopregnene-16α,17α,21-triol-11,20-dione.

By following the same procedure, there were treated the starting products listed below and there were obtained the corresponding 16,17-acetonide products hereinafter listed:

| Starting product | Final product |
| --- | --- |
| 2-hydroxymethyl-6α-chloro-9α-fluoro-Δ²-allopregnene-11β,16α,17α,21-tetrol-20-one. | The acetonide of 2-hydroxymethyl-6α-chloro-9α-fluoro-Δ²-allopregnene-11β,16α17α,21-tetrol-20-one. |
| 2-hydroxymethyl-9α-fluoro-Δ²-allopregnene-11β,16α,17α,21-tetrol-20-one. | The acetonide of 2-hydroxymethyl-9α-fluoro-Δ²-allopregnene-11β,16α,17α,21-tetrol-20-one. |
| 2-hydroxymethyl-9α-fluoro-Δ²-allopregnene-16α,17α,21-triol-11,20-dione. | The acetonide of 2-hydroxymethyl-9α-fluoro-Δ²-allopregnene-16α,17α,21-triol-11,20-dione. |
| 2-hydroxymethyl-9α-fluoro-Δ²,⁴-pregnadiene-11β,16α,17α,21-tetrol-20-one. | The acetonide of 2-hydroxymethyl-9α-fluoro-Δ²,⁴-pregnadiene-11β,16α,17α,21-tetrol-20-one. |
| 2-hydroxymethyl-6α-chloro-9α-fluoro-Δ²,⁴-pregnadiene-11β,16α,17α,21-tetrol-20-one. | The acetonide of 2-hydroxymethyl-6α-chloro-9α-fluoro-Δ²,⁴-pregnadiene-11β,16α,17α,21-tetrol-20-one. |
| 2-hydroxymethyl-6α-chloro-9α-fluoro-Δ²,⁴-pregnadiene-16α,17α,21-triol-11,20-dione. | The acetonide of 2-hydroxymethyl-6α-chloro-9α-fluoro-Δ²,⁴-pregnadiene-16α,17α,21-triol-11,20-dione. |
| 2-hydroxymethyl-9α-fluoro-Δ²,⁴-pregnadiene-16α,17α,21-triol-11,20-dione. | The acetonide of 2-hydroxymethyl-9α-fluoro-Δ²,⁴-pregnadiene-16α,17α,21-triol-11,20-dione. |
| 2-hydroxymethyl-6α-methyl-Δ²-allopregnene-11β,16α,17α,21-tetrol-20-one. | The acetonide of 2-hydroxymethyl-6α-methyl-Δ²-allopregnene-11β,16α,17α,21-tetrol-20-one. |
| 2-hydroxymethyl-6α-methyl-Δ²,⁴-pregnadiene-11β,16α,17α,21-tetrol-20-one. | The acetonide of 2-hydroxymethyl-6α-methyl-Δ²,⁴-pregnadiene-11β,16α,17α,21-tetrol-20-one. |

*Example V*

By following the procedure described in Example IV except that acetone was substituted by benzaldehyde, paraformaldehyde and cyclohexanone, there were obtained respectively the corresponding 16α,17α-benzylidenedioxy, 16α,17α-methylenedioxy and 16α,17α-cyclohexanone ketal derivatives of the starting compounds of Example IV.

*Example VI*

The final products described in Examples IV and V were converted into the corresponding C-2, C-21-diacetates; C-2, C-21-dipropionates; C-2, C-21-dicaproates and C-2, C-21-di(cyclopentylpropionates) in accordance with the methods described in Example III.

We claim:
1. A compound of the following formula:

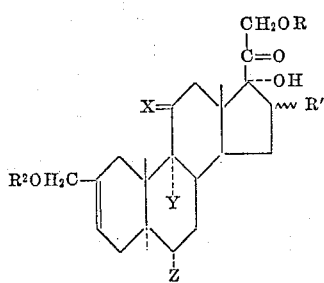

wherein R and R² are selected from the group consisting of hydrogen and a hydrocarbon carboxylic acyl group of less than 12 carbon atoms; R¹ is a member of the group consisting of hydrogen, α-methyl, β-methyl, α-hydroxyl and a α-acyloxy group derived from a hydrocarbon carboxylic acid of less than 12 carbon atoms; X is selected from the group consisting of β-hydroxyl and keto; Y is a member of the group consisting of hydrogen, fluorine and chlorine and Z is selected from the group consisting of hydrogen, fluorine, chlorine and methyl.

2. 2 - hydroxymethyl - 16α - methyl - 6α - fluoro - Δ² - allopregnen-17α,21-diol-11,20-dione.

3. 2 - hydroxymethyl - 16α - methyl - 6α,9α - difluoro - Δ²-allopregnen-17α,21-diol-11,20-dione.

4. 2 - hydroxymethyl - 16α - methyl - 6α - fluoro - 9α - chloro-Δ²-allopregnen-17α,21-diol-11,20-dione.

5. 2 - hydroxymethyl - 16α - methyl - 6α,9α - difluoro - Δ²-allopregnen-11β,17α,21-triol-20-one.

6. 2 - hydroxymethyl - 16α - methyl - 6α - fluoro - 9α - chloro-Δ²-allopregnen-11β,17α,21-triol-20-one.

7. 2 - hydroxymethyl - 16β - methyl - 6α,9α - difluoro - Δ²-allopregnen-11β,17α,21-triol-20-one.

8. 2 - hydroxymethyl - 16α - methyl - 6α,9α - difluoro - Δ²-allopregnen-17α,21-diol-11,20-dione.

9. 2 - hydroxymethyl - 6α,16β - dimethyl - Δ² - allopregnen-17α,21-diol-11,20-dione.

10. 2 - hydroxymethyl - 6α,16β - dimethyl - Δ² - allopregnen-11β,17α,21-triol-20-one.

11. 2 - hydroxymethyl - 6α - chloro - 9α - fluoro - Δ² - allopregnen-16α,17α,21-triol-11,20-dione.

12. 2 - hydroxymethyl - 6α - chloro - 9α - fluoro - Δ² - allopregnen-11β,16α,17α,21-tetrol-20-one.

13. A compound of the following formula:

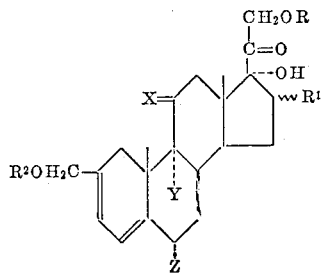

wherein R and R² are selected from the group consisting of hydrogen and a hydrocarbon carboxylic acyl group of less than 12 carbon atoms; R¹ is a member of the group consisting of hydrogen, α-methyl, β-methyl, α-hydroxyl and an α-acyloxy group derived from a hydrocarbon carboxylic acid of less than 12 carbon atoms, X is selected from the group consisting of β-hydroxyl and keto; Y is a member of the group consisting of hydrogen, fluorine and chlorine and Z is selected from the group consisting of hydrogen, fluorine, chlorine and methyl.

14. 2 - hydroxymethyl - 16α - methyl - 6α - fluoro-Δ²,⁴-pregnadien-17α,21-diol-11,20-dione.

15. 2 - hydroxymethyl - 16α - methyl - 6α,9α - difluoro-Δ²,⁴-pregnadien-17α,21-diol-11,20-dione.

16. 2 - hydroxymethyl - 16α - methyl - 6α - fluoro-9α - chloro - Δ²,⁴ - pregnadien - 17α,21 - diol - 11,20-dione.

17. 2 - hydroxymethyl - 16α - methyl - 6α,9α - difluoro-Δ²,⁴-pregnadien-11β,17α,21-triol-20-one.

18. 2 - hydroxymethyl - 16α - methyl - 6α - fluoro-9α-chloro-Δ²,⁴-pregnadien-11β,17α,21-triol-20-one.

19. 2 - hydroxymethyl - 16β - methyl - 6α,9α - difluoro-Δ²,⁴-pregnadien-11β,17α,21-triol-20-one.

20. 2 - hydroxymethyl - 16β - methyl - 6α,9α-difluoro-Δ²,⁴-pregnadien-17α,21-diol-11,20-dione.

21. 2 - hydroxymethyl - 6α,16β - dimethyl - Δ²,⁴-pregnadien-17α,21-diol-11,20-dione.

22. 2 - hydroxymethyl - 6α,16β - dimethyl - Δ²,⁴ - pregnadien-11β,17α,21-triol-20-one.

23. 2 - hydroxymethyl - 6α - chloro - 9α - fluoro-Δ²,⁴-pregnadien-16α,17α-21-triol-11,20-dione.

24. 2 - hydroxymethyl - 6α - chloro - 9α - fluoro-Δ²,⁴-pregnadien-11β,16α,17α,21-tetrol-20-one.

25. A compound of the following formula:

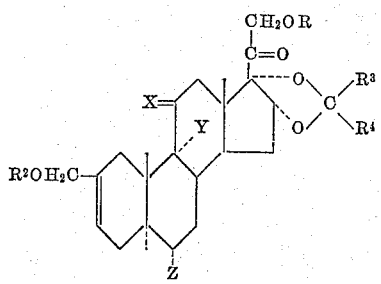

wherein X is selected from the group consisting of β-hydroxyl and keto; Y is a member of the group consisting of hydrogen, fluorine and chlorine and Z is selected from the group consisting of hydrogen, fluorine, chlorine and methyl; R and $R^2$ are selected from the group consisting of hydrogen and a hydrocarbon carboxylic acyl group of less than 12 carbon atoms; and $R^3$ and $R^4$ are each selected from the group consisting of hydrogen and a hydrocarbon radical containing up to 8 carbon atoms.

26. The acetonide of 2-hydroxymethyl-6α-chloro-9α-fluoro-$\Delta^2$-allopregnene-16α,17α,21-triol-11,20-dione.

27. A compound of the following formula:

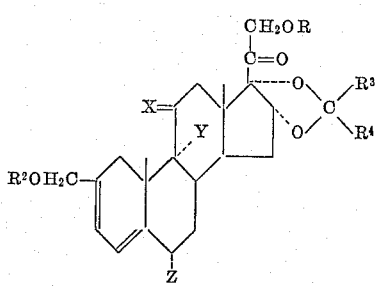

wherein X is selected from the group consisting of β-hydroxyl and keto; Y is a member of the group consisting of hydrogen, fluorine and chlorine and Z is selected from the group consisting of hydrogen, fluorine, chlorine and methyl; R and $R^2$ are selected from the group consisting of hydrogen and a hydrocarbon carboxylic acyl group of less than 12 carbon atoms; and $R^3$ and $R^4$ are each selected from the group consisting of hydrogen and a hydrocarbon radical containing up to 8 carbon atoms.

No references cited.